Figure 1:
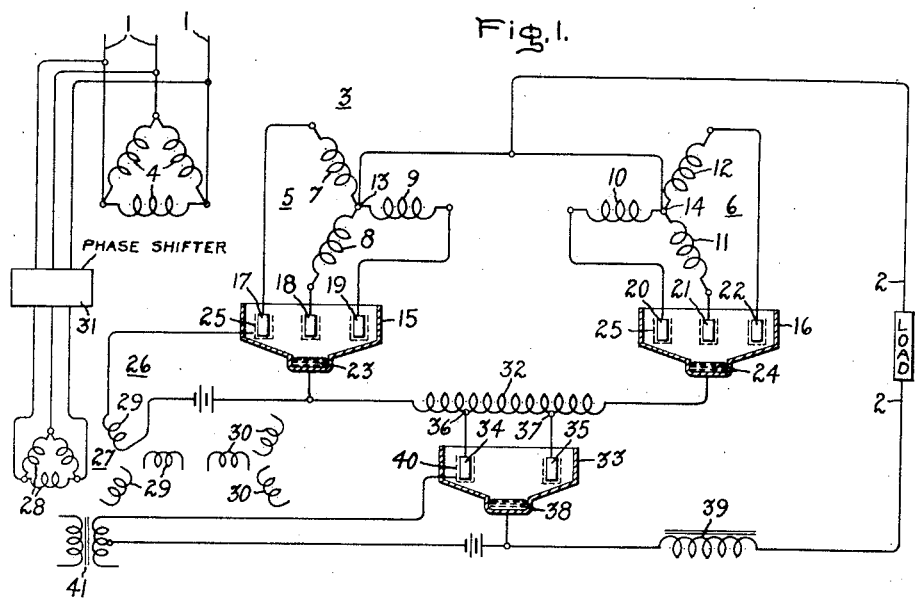

Nov. 26, 1940.  H. PUPPE  2,223,185

ELECTRIC VALVE CIRCUITS

Filed March 17, 1939  4 Sheets-Sheet 1

Inventor:
Heinz Puppe, Deceased,
by William A. Dodge, Administrator,
by Harry E. Dunham
His Attorney.

Nov. 26, 1940. H. PUPPE 2,223,185
ELECTRIC VALVE CIRCUITS
Filed March 17, 1939 4 Sheets-Sheet 2

DISCHARGE CURRENT CHARACTERISTIC

DISCHARGE CURRENT CHARACTERISTIC

Inventor:
Heinz Puppe, Deceased,
by William A. Dodge, Administrator,
by Harry E. Dunham
His Attorney.

Inventor:
Heinz Puppe, Deceased,
by William A. Dodge, Administrator,
by Harry E. Dunham
His Attorney.

Nov. 26, 1940.  H. PUPPE  2,223,185

ELECTRIC VALVE CIRCUITS

Filed March 17, 1939  4 Sheets-Sheet 4

Inventor:
Heinz Puppe, Deceased,
by William A. Dodge, Administrator,
by Harry E. Dunham
His Attorney Patented Nov. 26, 1940

2,223,185

UNITED STATES PATENT OFFICE 2,223,185

ELECTRIC VALVE CIRCUITS

Heinz Puppe, deceased, late of Berlin-Reinickendorf, Germany, by William A. Dodge, administrator, Schenectady, N. Y., assignor to General Electric Company, a corporation of New York Application March 17, 1939, Serial No. 262,542
In Germany March 31, 1938

10 Claims. (Cl. 175—363)

The invention relates to electric valve translating apparatus and more particularly to electric valve circuits for transmitting power between alternating current circuits and direct current circuits.

In electric valve translating circuits for the transmission of power between alternating current circuits and direct current circuits, it is desirable to employ a relatively large number of electric discharge paths in order to improve the wave form of the currents supplied to the load circuit. For example, in the transmission of power from alternating current circuits to direct current circuits, it is important in many applications to employ multi-phase rectifying systems in order that the wave form of the direct current voltage is relatively smooth and devoid of abrupt changes in magnitude which would be present by using a smaller number of phases. In addition, it is desirable to use arrangements which permit the simultaneous operation of two or more of the electric discharge paths so that the utilization or utility factor of the rectifier phases is maintained at a relatively large value. Rectifier circuits have accordingly been developed which operate so that two or more anodes carry current simultaneously and during a considerably greater portion of the voltage cycle than that which occurs in the case of simple multi-phase rectifier circuits. Many of these systems function by using what is termed phase equalizing or interphase transforming means. In arrangements of this nature, successive phases or independent phase groups are electromagnetically coupled so as to produce anode voltages which are more or less trapezoidal in wave form compared to the combined sinusoidal voltages of the simultaneously operating phases. Rectifier circuits employing interphase transformers or phase equalizing means may, therefore, be characterized by the features that as many anodes carry current simultaneously as there are couplings between phases or phase groups, and that the output voltage at any instant is equal to the mean of the voltages of the simultaneously operating phases.

In accordance with the teachings of the invention described hereinafter, there is provided a new and improved phase equalizing or interphase transforming means whereby the wave form of the delivered voltage is substantially improved so that it is possible to obtain a smoother output voltage than is obtainable by the prior art arrangements, and which accordingly involves the use of a smaller number of electric discharge paths than would otherwise be necessary to obtain the same output voltage characteristics.

It is an object of the invention to provide new and improved electric valve circuits.

It is another object of the invention to provide new and improved electric valve converter circuits for transmitting power between alternating current and direct current circuits.

It is a further object of the invention to provide new and improved phase equalizing or interphase transforming means for electric valve translating apparatus whereby the output voltage may be substantially improved in wave form.

In accordance with the illustrated embodiments of the invention described hereinafter, I provide new and improved phase equalizing or interphase transforming means for use in electric valve converters for transmitting power between alternating current circuits or between alternating current circuits and direct current circuits. The electric translating apparatus includes an inductive network comprising groups of phase windings displaced in phase with respect to each other and each provided with an electrical neutral connection. Electric valve means or electric discharge paths are associated with each of the groups of windings and phase equalizers or phase balancers, sometimes referred to as interphase transformers, are connected with the inductive networks or with the discharge paths of the electric valve means for balancing the instantaneous voltage difference between simultaneously operating phases. In order to improve the wave form of the voltage delivered to the load circuit, as for example to improve the wave form of the voltage impressed on a direct current load circuit, there is provided an improved interphase transforming means comprising an interphase transformer and an associated auxiliary electric valve means or auxiliary electric discharge device which controls the ratio of the number of turns of the interphase transformer preferably at a frequency which is a multiple of the frequency of the associated alternating current circuit. In one arrangement of my invention, the interphase transformer is connected to the cathodes of two electric valve means associated with two groups of phase windings. The interphase transformer is provided with a pair of intermediate taps or connections which in turn are connected to the anodes of the auxiliary electric valve means. Current is commutated between the two anodes of the auxiliary electric valve means at a frequency which is equal to $2n$ times the frequency of the voltage of the associated alternating current supply circuit, where $n$ is equal to the number of phases in each of the associated phase groups. As a result, more specifically in the case of a double-Y connection with interphase transformer, the wave form of the output voltage will have a twelve-phase ripple instead of the ordinary six-phase ripple.

Figure 2:
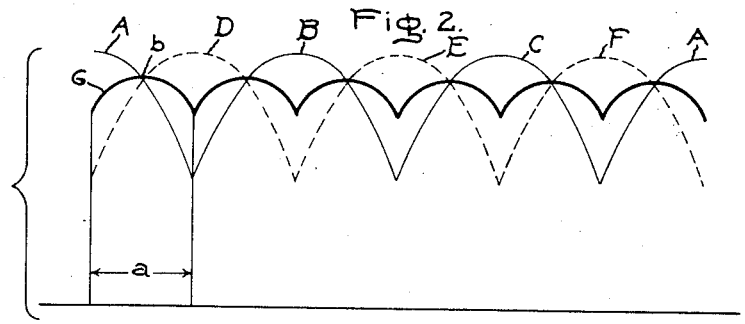
Figure 3:
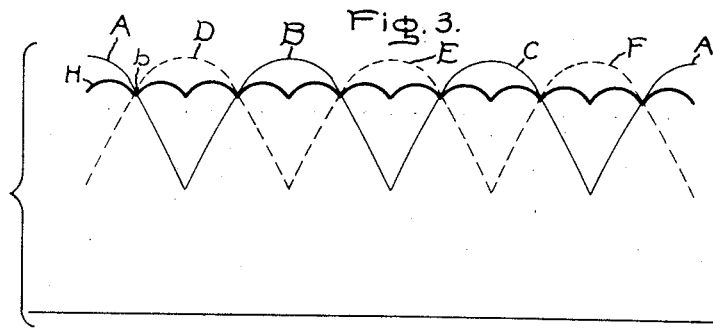
Figure 5:
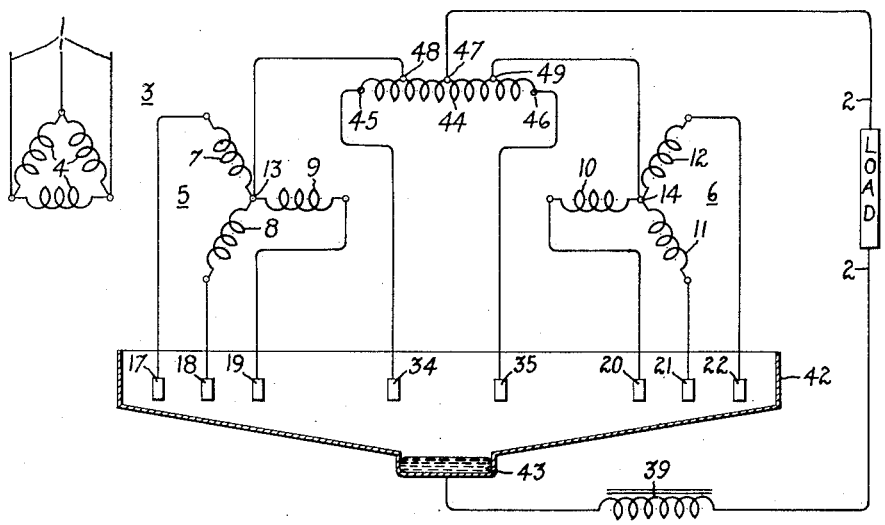
Figure 4:
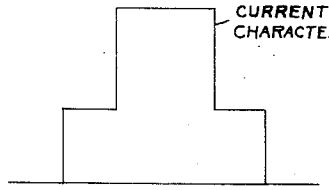
Figure 6:
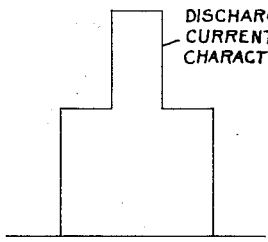
Figure 7:
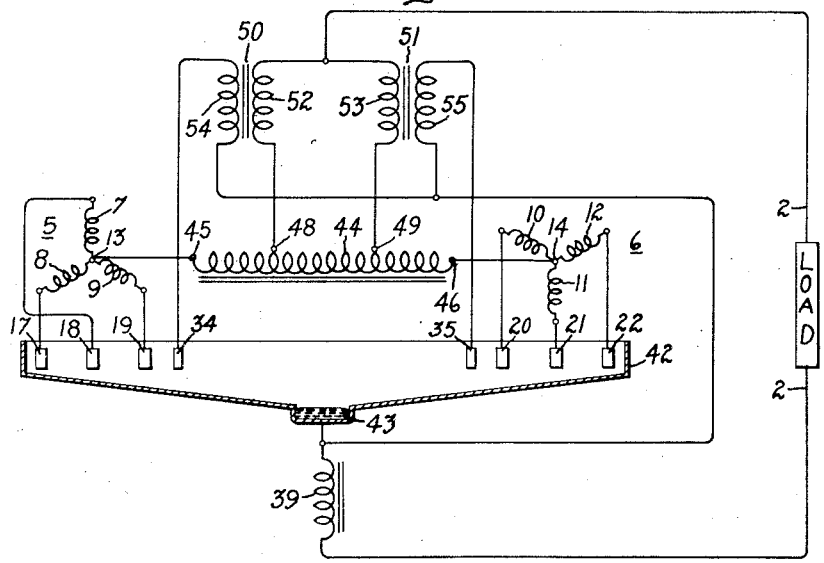
Figure 8:
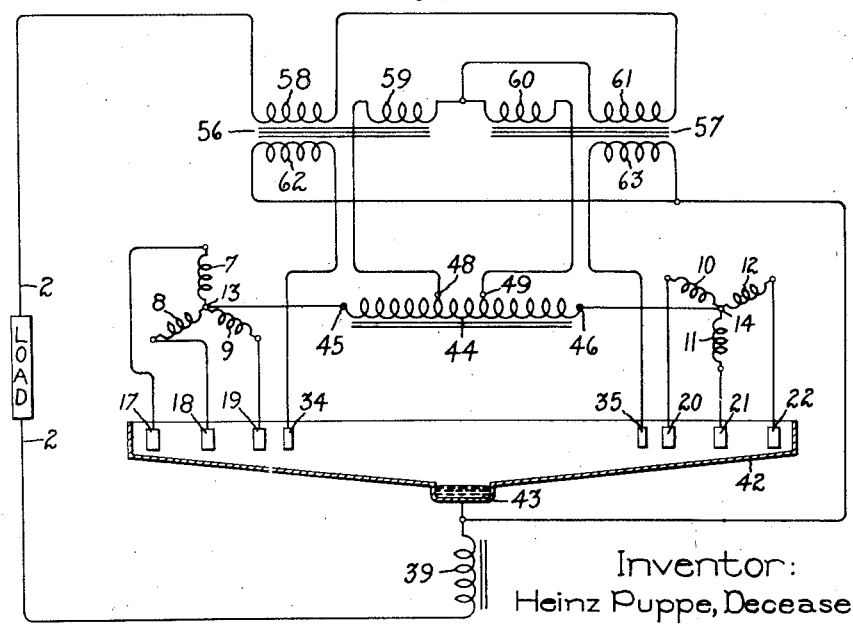
Figure 9:
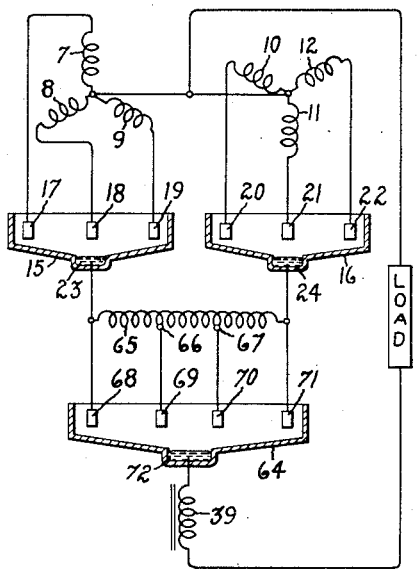
Figure 10:
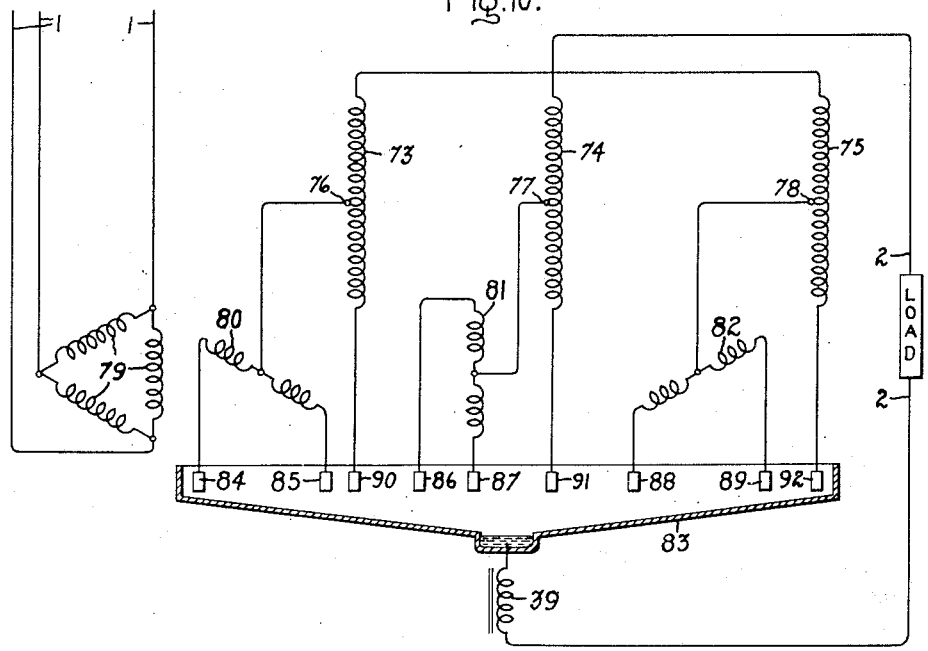

For a better understanding of the invention, reference may be had to the following description taken in connection with the accompanying drawings, and its scope will be pointed out in the appended claims. Fig. 1 diagrammatically illustrates an embodiment of the invention as applied to an electric valve translating system employing a double-Y system of windings with an interphase transformer, and Figs. 2, 3 and 4 represent certain operating characteristics thereof. Fig. 5 diagrammatically illustrates another embodiment of the invention in which the interphase transformer is connected between the neutrals of two groups of phase windings, and in which the terminals of the interphase transformer are connected to a pair of electric discharge paths which operate concurrently with the principal electric valve means during at least a portion of the cycle of voltage of the associated supply. Fig. 6 represents an operating characteristic of the arrangement of Fig. 5. Figs. 7 and 8 diagrammatically illustrate certain modifications of the embodiment of the invention shown in Fig. 1 in which the auxiliary discharge paths are energized by means of inductive devices connected to be energized in accordance with the current of the direct current circuit, and Figs. 9 and 10 are modifications of the arrangement shown in Fig. 1.

Fig. 1 of the invention is shown as applied to an electric valve translating circuit for transmitting power between an alternating current circuit 1 and a direct current circuit 2. The electric translating apparatus comprises a transformer 3 having a plurality of primary windings 4 and a plurality, such as a pair of groups, of secondary windings 5 and 6, including windings 7, 8 and 9, and 10, 11 and 12, respectively. The windings of each group are displaced in phase to form a symmetrical three-phase circuit, and the windings of the respective groups are displaced substantially 180° in order to furnish a double-Y system. The windings of groups 5 and 6 are connected to provide electrical neutral connections 13 and 14, respectively. Electric valve means 15 and 16 are associated with the phase winding groups 5 and 6, respectively, and are preferably of the type employing an ionizable medium such as a gas or a vapor, and comprise anodes 17, 18 and 19, and 20, 21 and 22, respectively. The electric valve means 15 and 16 may be provided with cathodes of the self-reconstructing type, such as mercury pool cathodes 23 and 24 respectively. Each of the anodes of the electric valve means 15 and 16 may be provided with control members or grids 25 which control the time of initiation of electric discharges between the associated anodes and the associated cathodes.

Suitable periodic control voltages may be impressed on the grids 25 by means of a control circuit 26 which, in turn, may comprise a transformer 27 having primary windings 28 and a plurality of secondary windings 29 and 30. The phase of the voltages impressed on the control grids 25 with respect to the applied anode-cathode voltages may be adjusted or controlled by means of a phase shifter such as a rotary phase shifter 31.

A phase balancer or a phase equalizer, commonly termed an interphase transformer, may be associated with the respective groups of phase windings, or the associated electric valve means 15 and 16, to equalize the difference between the instantaneous voltage difference of simultaneously operating phases in order to cause predetermined anodes of the electric valve means to operating simultaneously, thereby increasing the utilization factor of the electric valve means and the associated windings. This phase balancing means may take the form of an interphase transformer 32 connected between cathodes 23 and 24 of electric valve means 15 and 16. The interphase transformer 32 is controlled in a manner to improve the wave form of the voltage transmitted to one of the circuits, such as the direct current circuit 2. There is provided an auxiliary electric valve means 33 which controls the ratio of the turns of the interphase transformer 32 at a frequency equal to a multiple of the frequency of the alternating current supply circuit 1, and which operates to control an electrical condition of one of the associated circuits. The electric valve means 33 is also preferably of the type employing an ionizable medium and includes a pair of anodes 34 and 35 which are connected to taps 36 and 37 of the interphase transformer 32. Cathode 38 of the electric valve means 33 is connected to one terminal of the direct current load circuit 2 through a suitable smoothing reactance or choke 39. The electric valve means 33 may also be of the controlled type, if desired, having control members of grids 40; and periodic control voltage adjustable in phase may be impressed on these grids by means of a transformer 41 energized from a suitable alternating current circuit of the proper frequency.

It has been found that satisfactory operation occurs when there is a predetermined ratio between the turns of the various portions of the interphase transformer 32. For example, it has been found that satisfactory operation occurs when the portions of the winding of the interphase transformer 32 between the taps 36 and 37 and the respective end terminals each include twenty-six turns and when the intermediate portion of the winding includes forty-five turns.

The operation of the embodiment of the invention shown in Fig. 1 will be explained by considering the system when it is operating as a multi-phase rectifier to energize the direct current circuit 2 from the alternating current supply circuit 1. While the system may employ grid excitation to control the time at which the various electric discharge paths are rendered conductive, the following description is concerned with the operation of the electric valve apparatus when the grid voltages are advanced with respect to the respective anode-cathode voltages so that the electric valve means operate as uncontrolled rectifiers. Due to the operation of the interphase transformer 32, each of the electric valves 15 and 16 operates as a three-phase rectifier, each of the anodes conducting current for substantially 120 electrical degrees. As is well understood by those skilled in the art, the interphase transformer 32 produces an equalizing voltage which tends to maintain an equal current distribution between the simultaneously operating phases. This equalizing voltage is a harmonic voltage generated by the difference in the instantaneous values of the direct currents flowing in the two rectifying systems. In the arrangement shown in Fig. 1, that is in a double three-phase Y system, the harmonic voltage is a third harmonic which circulates between the neutral points of the respective three-phase systems and produces a corresponding third harmonic flux which, in turn, generates the required phase-equalizing voltage.

Auxiliary electric valve means 33 controls the ratio of the effective number of turns of the interphase transformer 32, thereby improving the wave form of the voltage impressed on the direct current circuit 2. In addition, the electric valve means 33, cooperating with the interphase transformer 32 produces a stepped current wave. Such a current wave offers the advantage that shortly before the arc extinction, the discharge current is comparatively small, thereby reducing the danger of arc-back.

For a better understanding of the operation of the system shown in Fig. 1, reference may be had to the following characteristics shown in Fig. 2, 3 and 4. Curves A, B and C of Fig. 2 represent the voltages applied to anodes 17, 18 and 19 of electric valve means 15, and curves D, E and F of Fig. 2 represent the voltages applied to anodes 20, 21 and 22 of electric valve means 16. The heavy curve G represents the output voltage of the electric valve means which would be impressed on the direct current circuit 2 in the absence of the electric valve means 33, that is, by utilizing an interphase transformer only. It will be noted that, for example, during the interval a, anodes 17 and 20 conduct current simultaneously, the interphase transformer serving to equalize the instantaneous difference of the respective phase voltages so that the two anodes conduct current simultaneously. Each anode conducts current for substantially 120 electrical degrees. At time b, it is understood that the instantaneous values of the voltages of anodes 17 and 20 are equal. In Fig. 3, curve H represents the output voltage impressed on the direct current load circuit 2 by utilizing the auxiliary electric valve means 33. It will be noted that the wave form is improved and that the ripple is twice that which would be present were it not for the operation of the electric valve 33. This increased ripple and improved wave form are obtained by the commutation of current between anodes 34 and 35 of electric valve means 33. For example, during the interval in which anodes 17 and 20 conduct current simultaneously, anode 34 conducts current so long as the instantaneous phase voltage applied to anode 17 is positive with respect to the phase voltage applied to anode 20. At time b, current is conducted from anode 34 to anode 35; that is, current is conducted to anode 35 when the instantaneous phase voltage applied to anode 20 exceeds that applied to anode 17. By the proper choice of the number of turns in the interphase transformer 32 and the position of the taps 36 and 37, the wave form of the ripple may be controlled. Furthermore, by the choice of the number of turns the wave form of the current conducted by the electric valve means is controllable. The diagram of Fig. 4 illustrates the wave form of the current conducted by the electric discharge path and also represents the wave form of the alternating current supplied to the rectifying system. It will be noted that this wave form corresponds to that ordinarily furnished by a twelve-phase rectifier.

The system of Fig. 1, of course, may be operated by utilizing grid excitation for controlling the time at which the various electric discharge paths are rendered conductive. That is, control or excitation circuit 26 may be employed to control the time at which anodes 17—22 begin to conduct current. Under these conditions, of course, it is understood that the control voltages impressed on control grids 40 of electric valve means 33 must be given a corresponding phase displacement in order that proper symmetry of the output voltage is maintained.

While the system has been explained in connection with a rectifying operation, it is to be understood that the system is applicable for the transfer of power in either direction between alternating current circuits and direct current circuits.

Fig. 5 diagrammatically illustrates another modification of the invention in which an interphase transformer is connected between the neutral points 13 and 14 of the respective groups of phase windings. In the arrangement of Fig. 5, the principal anodes 17—21 and the auxiliary anodes 34 and 35 are shown within a single receptacle 42 having a cathode 43. The interphase transformer 44 includes a pair of terminal connections 45 and 46 which are connected to the anodes 34 and 35, respectively, a neutral connection 47 which is connected to one terminal of the direct current circuit 2, and a pair of intermediate connections 48 and 49 which are connected to neutral connections 13 and 14 of the groups 5 and 6.

The embodiment of the invention shown in Fig. 5 operates to improve the wave form of the voltage impressed on the direct current circuit 2, and also operates to obtain a current characteristic represented by the diagram in Fig. 6. The auxiliary anodes 34 and 35 conduct current alternately and each conducts current a predetermined interval of time during each cycle of voltage of circuit 1 with the principal anodes. For example, if the anodes 17 and 20 are of equal potential, there is substantially no voltage applied to the interphase transformer 44. In that case the entire load current is transmitted by anodes 17 and 20. If the interphase transformer is designed so that the portions of the windings between terminals 45 and 48 and 46 and 49 each have seventy-four turns and the intermediate portions each have thirteen turns, fifteen electrical degrees after the instant of equal potentials applied to anodes 17 and 20, anode 34 commutates current from anode 17 since it exhibits a higher positive potential than any of the anodes 17, 18 or 19. Consequently, the anode 20 assumes 87 per cent of the current and the anode 34 conducts 13 per cent of the load current. After the lapse of 30 electrical degrees, that is 15 electrical degrees of the time of equal potentials applied to anodes 18 and 20, the current commutates from anode 34 to anode 18. Anodes 18 and 20 conduct current simultaneously for 30 electrical degrees and each anode transmits one-half the load current. There is also a combined operation of anode 18 with the auxiliary anode 35, similar to the combined operation between anodes 20 and 34. The operation of the arrangement of Fig. 5 differs from that of Fig. 1 inasmuch as the anodes 17—22 conduct current only during 90 electrical degrees.

Anodes 34 and 35 work alternately during three intervals of 30 electrical degrees during each cycle of voltage of circuit 1. Thus, as in the arrangement of Fig. 1, the direct current voltage impressed on circuit 2 exhibits a twelve-phase ripple and the alternating current conducted to the rectifier has a curve shape such as that exhibited by a twelve-phase rectifier. In this arrangement, it should be noted that the voltage increase at the main discharge taps is divided in two steps of approximately the same magnitude, so that the actual voltage increase which stresses the arc discharge paths is reduced to about one-half the usual value.

Fig. 7 diagrammatically illustrates another embodiment of the invention which is similar in many respects to that shown in Fig. 5, and corresponding elements have been assigned like reference numerals. There is provided an auxiliary circuit energized in response to the current of the direct current circuit for applying voltages to the auxiliary anodes 34 and 35. The auxiliary circuit comprises a pair of inductive devices, such as transformers 50 and 51, having primary windings 52 and 53, respectively, which are connected between one terminal of the direct current circuit and connections 48 and 49 of the interphase transformer 44. Secondary windings 54 and 55 of the transformers 50 and 51 are connected between the cathode 43 of the electric valve means 42 and anodes 34 and 35. The operation of the embodiment of the invention shown in Fig. 7 is substantially the same as that explained above in connection with Fig. 1.

Fig. 8 represents a modification of the arrangement of the invention shown in Fig. 7. To obviate the disadvantages of unidirectional magnetization of the transformers 50 and 51 in the arrangement of Fig. 7, there is provided transformers 56 and 57 having opposing primary windings 58, 59 and 60, 61, respectively, and having secondary windings 62 and 63, respectively, which are connected between anodes 34 and 35 and cathode 43. Inasmuch as windings 59 and 60 oppose the unidirectional current transmitted by windings 58 and 61, transformers 56 and 57 are not unidirectionally magnetized, thereby permitting more accurate control of the wave form impressed on the direct current circuit 2. The embodiment of the invention shown in Fig. 8 operates substantially as that explained above in connection with Fig. 1.

Fig. 9 illustrates a still further embodiment of the invention and is similar in many respects to the arrangement of Fig. 1. In the arrangement of Fig. 9, there is employed an electric valve means 64 and an associated interphase transformer 65 which is connected across cathodes 23 and 24 of electric valve means 15 and 16. The interphase transformer 65 has intermediate connections 66 and 67. Electric valve means 64 includes a plurality of anodes 68, 69, 70 and 71 and a cathode 72. Intermediate connections 66 and 67 of interphase transformer 65 are connected to anodes 69 and 70, and anodes 68 and 71 are connected to cathodes 23 and 24 of electric valve means 15 and 16.

In the arrangement of Fig. 9, the anodes of electric valve means 64 operates in the following sequence: 68, 69, 70, 71, 68, etc. In this arrangement the interphase transformer 65 becomes ineffective within certain intervals, but it is emphasized that it is important that the ratio of the number of turns of the interphase transformer be periodically altered as is accomplished by the periodic conduction of the anodes 68—71.

Fig. 10 diagrammatically illustrates a still further embodiment of the invention as applied to an electric valve translating system of the triple single phase type employing a three-phase interphase transformer including windings 73, 74 and 75 having intermediate connections 76, 77 and 78, respectively. An inductive network, including a plurality of primary windings 79 and secondary windings 80, 81 and 82 forms three individual single phase full wave converting systems. An electric valve means 83 having principal anodes 84, 85, 86, 87, 88, 89 and auxiliary anodes 90, 91 and 92 transmits to the load circuit 2 a direct current having a twelve-phase ripple. Auxiliary anodes 90, 91 and 92 are connected to windings 73, 74 and 75 of the interphase transformer, and connections 76, 77 and 78 of the interphase transformer are connected to the neutral connections of windings 80, 81 and 82, respectively. Windings 73, 74 and 75 may be connected in a zigzag arrangement, and by the choice of the proper ratio of the number of turns the system may be made to operate so that the main discharge paths each conduct current during fifteen electrical degrees, and the auxiliary discharge paths alternately conduct current twice during every thirty electrical degrees during each cycle of voltage of the supply circuit 1.

While there is shown and described the invention as applied to a particular system of connections and as embodying various devices diagrammatically shown, it will be obvious to those skilled in the art that changes and modifications may be made without departing from the invention, and, therefore, it is the aim in the appended claims to cover all such changes and modifications as fall within the true spirit and scope of the invention.

What is claimed as new and desired to be secured by Letters Patent of the United States is:

1. In combination, an alternating current circuit, a direct current circuit, electric translating apparatus connected between said circuits and comprising a plurality of groups of phase windings and electric discharge means, said groups of phase windings each having a neutral connection, an interphase transformer having a pair of terminal connections, a neutral connection and a pair of connections intermediate said terminal connections and said neutral connection, said neutral connection of said interphase transformer being connected to one terminal of said direct current circuit and said intermediate connections being connected to the neutral connections of said groups of phase windings, and auxiliary electric discharge means connected to the terminal connections of said interphase transformer to provide a path for current flow between said interphase transformer and said direct current circuit.

2. In combination, an alternating current circuit, a direct current circuit, electric translating apparatus connected between said circuits and comprising a plurality of groups of phase windings and associated electric discharge means, said groups of phase windings each having a neutral connection, an interphase transformer connected between the neutral connections for equalizing phase voltages of the respective groups, inductive means connected between said direct current circuit and said interphase transformer and energized in accordance with the current of said direct current circuit, and an auxiliary circuit connected to said inductive means and comprising auxiliary electric discharge means for controlling the wave form of the voltage of one of said first mentioned circuits.

3. In combination, an alternating current circuit, a direct current circuit, electric translating apparatus connected between said circuits and comprising a pair of groups of phase windings each having a neutral connection, an interphase transformer connected between the neutral connection of said windings and having a pair of taps, electric discharge means connected in circuit with said windings, a pair of inductive devices each connected to a different one of said taps and connected to be energized in accordance with the current conducted by the associated electric discharge means, and a pair of auxiliary electric discharge means energized by said inductive devices for controlling the wave form of the voltage impressed on said direct current circuit.

4. In combination, an alternating current circuit, a direct current circuit, a plurality of rectifying systems connected between said circuits and each including a plurality of windings and an associated electric valve means, interphase transforming means connected between said systems, and means for controlling the ratio of the effective number of turns of said interphase transforming means at a frequency which is a multiple of the frequency of said alternating current circuit and comprising controlled electric valve means connected between said interphase transforming means and said direct current circuit.

5. In combination, an alternating current circuit, a direct current circuit, a plurality of rectifying systems connected between said circuits and each including a plurality of windings and an associated electric valve means, interphase transforming means connected between said systems, electric valve means connected between said direct current circuit and said interphase transforming means for controlling the ratio of the number of turns of said interphase transforming means to control the current conducted by said first mentioned electric valve means, and means for controlling the conductivity of said last mentioned electric valve means.

6. In combination, an alternating current supply circuit, a direct current load circuit, a plurality of rectifying systems connected between said circuits and each including a plurality of windings and an associated electric valve means, interphase transforming means connected between said systems, electric valve means connected between said direct current circuit and said interphase transforming means to control the effective ratio of the number of turns of said transforming means to control the voltage impressed on said direct current circuit, and means for controlling the conductivity of the last mentioned electric valve means.

7. In combination, an alternating current circuit, a direct current circuit, electric translating aparatus connected between said circuits and comprising a plurality of groups of phase windings each having a neutral connection connected to one terminal of the direct current circuit and electric valve means associated with said windings, said electric valve means each having a plurality of anodes each connected to a different one of said phase windings and having an associated cathode, an interphase transformer connected between the cathodes of the electric valve means and having a pair of intermediate connections, and an auxiliary electric valve means for controlling said interphase transformer and comprising a pair of anodes connected to said cathodes and a pair of anodes connected to said intermediate connections of said interphase transformer.

8. In combination, an alternating current circuit, a direct current circuit, electric translating apparatus connected between said circuits and comprising three single phase rectifying systems each comprising a winding and a pair of electric valve means, a three phase interphase transformer comprising three windings each of which is associated with a different one of said first mentioned windings, and three auxiliary electric valve means associated with said last mentioned windings for controlling the voltage of one of said first mentioned circuits.

9. In combination, an alternating current circuit, a direct current circuit, a plurality of rectifying systems connected between said circuits and each including a plurality of windings and an associated electric valve means, said electric valve means being provided with control members for controlling the conductivity thereof, means for energizing said control members, interphase transforming means connected between said systems, and means for controlling the ratio of the effective number of turns of said interphase transforming means at a frequency which is a multiple of the frequency of the alternating current circuit and comprising controlled electric valve means connected between said interphase transfoming means and said direct current circuit.

10. In combination, an alternating current circuit, a direct current circuit, a plurality of rectifying systems connected between said circuits and each including a plurality of windings and an associated electric valve means, said electric valve means being provided with control members for controlling the conductivity thereof, means for energizing said control members, interphase transforming means connected between said systems, auxiliary electric valve means for controlling the ratio of the effective number of turns of said interphase transforming means to control the voltage of one of said first mentioned circuits, said last mentioned electric valve means having control members, and means for impressing on said last mentioned control members periodic control voltages.

WILLIAM A. DODGE,
*Administrator of the Estate of Heinz Puppe, Deceased.*